Jan. 30, 1940.    A. J. KIEHNE    2,188,788
DIE
Filed May 1, 1939
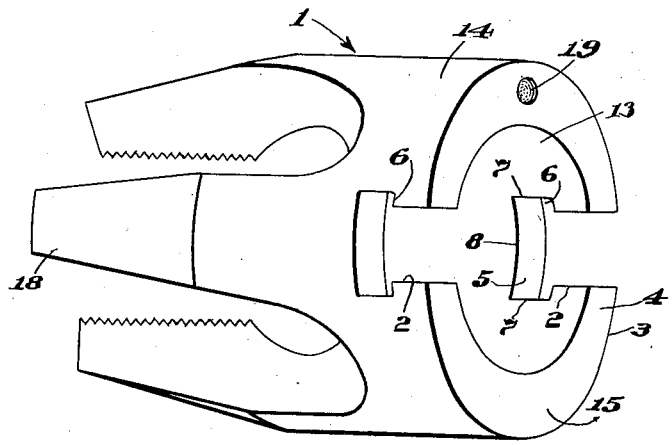
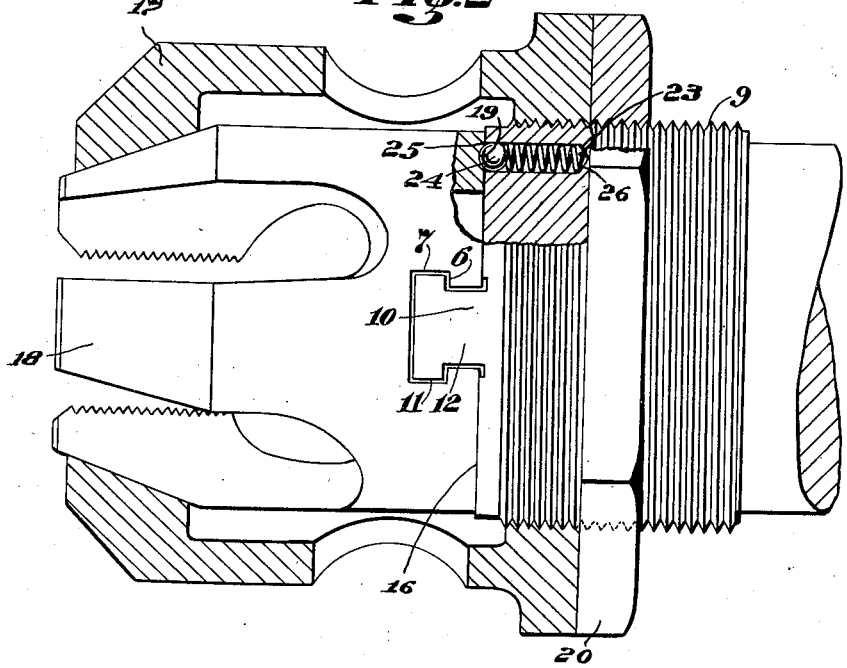
INVENTOR
Alfred J. Kiehne
BY J. L. Stockpole
ATTORNEY Patented Jan. 30, 1940

2,188,788

UNITED STATES PATENT OFFICE 2,188,788

DIE

Alfred J. Kiehne, Derby Line, Vt., assignor to Union Twist Drill Company, Athol, Mass., a corporation of Massachusetts Application May 1, 1939, Serial No. 271,015

4 Claims. (Cl. 10—119)

This invention relates to a thread cutting die and mounting therefor for use in machine tools.

Thread cutting dies are separate tools adapted to be mounted and dismounted upon a machine tool, to change from a die of one size to a die of another size, or to renew an old die, as may be desired. Such dies are driven about an axis of rotation—commonly a horizontal axis or a vertical axis—and they are designed for facility in mounting and dismounting on a machine tool while providing a good driving connection and a rigid support for the die.

In the past, such dies have been provided with slots in the base of the die, in the form of a kerf, adapted to fit over a mating projection or rib across the face of the driving spindle. The form of the slot and mating projection always has been such that the die is mounted in place with the projection engaging in the slot, by moving the die toward the spindle in a direction along the axis of the spindle. Such a connection is characterized by complete freedom of movement of the die relative to the spindle in an axial direction. The die is secured in place on the spindle by a cage or cap which fits over the die and screws onto the end of the spindle. The cage has an internal conical or tapered surface which engages with tapered faces on the die to clamp the die in place on the spindle. Without the cage, the die would fall off the spindle. In mounting such a die, the operator places the die in the cage and screws the cage onto the spindle. In so mounting the die, care must be exercised to align the slot, in the die, with the projection on the face of the spindle as the cage is screwed onto the spindle, and this is particularly difficult in many present-day automatic machine tools in which the operator with one hand only has to reach down in and replace dies that he cannot fully see, if at all.

Experience has shown that in a considerable percent of die mounting operations an operator fails properly to align the die with the spindle, with the result that, when the cage is tightened on the die, frequently the die is cocked out of alignment with the result that the prongs become excessively flexed or adjused below the intended cutting size. The prongs are thus subjected to possible fracture, and, if the misaligned die is used, it will ruin the work, and injure the die, holder, or both. Also, the care required in properly aligning the die, during mounting, wastes the time of the operator.

It is an object of this invention to provide a novel connection between a die and the spindle of a machine by which the die may be arranged and held in place—though movably and adjustably—on the spindle preliminary to placing the cage, the die, meanwhile, being supported by the engagement with the spindle without the aid of the cage. It is an object to provide a die having a novel and sufficiently loose connection with a spindle with or without frictional holding means and which enables an operator initially to place the die on the spindle in approximate alignment and in complete driving connection as a preliminary operation separate from and independent of the subsequent act of placing and screwing the cage onto the spindle, which cage then moves the die to and secures it in perfect axial alignment with the spindle and in proper drivable relation thereto.

Other objects and advantages of the invention appear in the following detailed description taken in connection with the accompanying drawing in which:

Figure 1 is a perspective view of a die provided with spindle connection elements suitable for use in this invention; and Figure 2 is a view in side elevation, partly in section, showing the complete die and mounting of this invention and illustrates the connection between a spindle and die, with the retaining and centering cage and locknut in place.

This invention is concerned with the structure and mode of operation of the connection between the die and the spindle. To avoid axial misalignment of the die, relative to the projection on the spindle for engaging and driving the die, the connection is so made that the die may be assembled initially and temporarily held on the spindle without the cage (and hence without interference thereby), the machine operator being able to manipulate the die freely and positively when mounting it. To retain the advantage gained by providing for free and positive manipulation of the die when mounting it, the assembling connection is so made as to be self-sustaining, thereby leaving the operator free to place and screw on the cage without further attention to the arrangement of the die on the spindle with but one hand and regardless of whether he can see what he is doing.

As shown in Fig. 1, the preferred form of die 1 is provided with slots 2 in the margin 3 of the die. The slots 2 are open along the rim 4 so that a rib projecting from the face of a spindle may engage therein. Slots 2 open into slots 5, there being shoulders 6, which extend in a plane substantially perpendicular to the axis of the die. The slots 5 are bounded by faces 7 and 8, which define the substantially rectangular form of the slots.

The spindle 9 is provided with projections 10 which are upstanding from the flat end face 16 of the spindle in the direction of the spindle axis though a single projection would serve as an equivalent, said end face being ground in a plane at right angles to said axis. The projections 10 are of a shape and size to fit freely and with substantial clearance (as shown) within the slots 2 and 5, the fit being not a close sliding one but free enough so as to permit later the required centering of the die accurately on and in axial alignment with the spindle whether the required freedom be in line with the slots 2 and 5, laterally of said slots, or any of them, or both. The connection thus permits the die slightly to rock and to rotate with reference to the spindle. The die of Fig. 1 is shown, mounted on the spindle 9, in Fig. 2. As shown there, each head 11 of each projection 10 fits within the slots 5 and engages with shoulders 6 and faces 7 and 8. Each stem 12 of each projection 10 may or may not engage with the walls of slots 2, there being some advantage in providing for such engagement in that greater surface area is provided for transmitting the driving force.

The slots 2 and 5 are open at the inner and outer surfaces 13 and 14 of the end wall 15, which forms the hub or base of the die, said end wall or surface 15 being accurately ground and in a plane at right angles to the axis of the die 1. Also, said end wall, as shown, may have a shallow depression 19 therein, as hereinafter referred to. The die may be mounted upon, or dismounted from, the projections 10 by sliding the die across the face of the spindle 9, the faces of the slots 2 and 5 tracking along but freely clearing the surfaces of the projections 10 and with the surface 15 abutting the ground surface 16 of the spindle.

In practice, an operator takes a die, separately, and slides it in place across the face of the spindle, arranging the projections 10 in the slots 2 and 5. When the die has been substantially or roughly centered on the spindle the operator releases the die and it hangs in place by virtue of the engagement between the heads 11 of projections 10 with the shoulders 6 and walls 7 and 8, of slots 5. The projections 10 should extend in a substantially horizontal direction when mounting the die, so that the die may not slide off the projections 10 by operation of the force of gravity. This position of the projections 10 easily may be arranged by the operator simply by turning the spindle by hand.

The operator next takes a cage 17 and slips it over the die by end-wise movement along the axis of the spindle. The threads of the cage 17 are engaged with the threads of the spindle 9 and the cage 17 is screwed onto the spindle. As the cage is tightened against the die 1, the internal conical or sloping surface of the cage 17 engages with the sloping surface 18 of the die prongs. This engagement between the sloping surfaces of the cage and the die operates to center and axially align the die accurately on the spindle, to clamp the die tightly in place, and to flex the prongs of the die slightly to proper cutting position. The locknut 20 is then set up to lock the cage in position.

It will be apparent that by separating the operation of placing the die on the spindle from the operation of screwing the cage on the spindle, danger of misalignment of the die relative to the driving projections of the spindle is wholly eliminated. While the operation of mounting the die has been separated into two parts, each of those parts is so positively under the control of the operator that he may perform the operation of mounting the die with much more facility than is usual, when the die and the cage are mounted simultaneously, as is common practice, and with complete elimination of any possible misalignment or breakage of dies or other parts.

The shape and arrangement of the slots, in the die, and the projections, on the spindle, which sufficiently restrain the die from free movement relative to the spindle in a direction along the axis of the spindle and die, characterize the invention. The particular shape and arrangement of inter-engaging slots and projections shown in Figs. 1 and 2 is but one example which typifies the invention, though any one of various shapes of the slots are suitable for practicing this invention when used in connection with a complementary headed or enlarged end projection on the spindle, which is of such shape as to fit the slots with the required free sliding fit.

While it is desirable to make both slots identical with one another it will be apparent that identity of the two slots is not essential to the practice of the invention. Lack of identity between the two slots can be compensated for by providing the same dissimilarity between the projections from the face of the spindle, each projection being adapted to engage with a corresponding slot.

As pointed out hereinbefore in connection with Fig. 2, the orientation of the spindle must be such that the projections 10 lie in a substantially horizontal plane so that the die, when arranged in place on the spindle, will not slip off the projections. Avoidance of the necessity for arranging the spindle in any particular plane of orientation, incident to mounting the die on the spindle, is the result which may be achieved, for example, by the use of a suitable friction device, say by a depression 19 in the die and a recess 23, drilled into the spindle. A ball 24 is located within the recess at the forward end thereof. The metal around the open end of the recess 23 is turned in to form a shoulder 25 adequate for retaining the ball 24 in place. A spring 26 is arranged in the recess 23 and presses the ball 24 so that the ball tends to project slightly beyond the face of the spindle and into the shallow depression 19, if provided.

When the die 1 is mounted upon the spindle 9 with the projections 10 engaging within the slots 5, the ball 24 presses against the surface 15 of the die or into the depression 19 (as the case may be), adjoining the face of the spindle. The pressure exerted by the spring through the ball on the rear face of the die, holds the die in place on projections 10 irrespective of the plane of orientation of the spindle.

The invention has been described in detail by way of illustration. It is not intended so to limit the invention. Variations in the details of construction may be made, as will be apparent to one skilled in the art, without departing from the scope of the invention as defined in the following claims.

This application is a continuation-in-part of my application Serial No. 178,727, filed December 8, 1937, said application having been formally abandoned May 10, 1939.

Having described my invention, what I claim is:

1. The combination in a die cutting device of a supporting spindle member, a die cutting member, and a cage, the supporting spindle member having a circular end surface at right angles to the spindle axis and an external thread, the die cutting member having an axial bore, an annular hub having an end surface at right angles to the axis of the bore and separated prongs extending outwardly axially, each prong having thread cutting teeth on its inner surface, and a tapered external surface, loosely-fitting headed connections between the abutting ends of the supporting member and the die cutting member, the parts of which connections are mutually engageable by relative radial movement only, said connections preventing direct axial separation of said members and being so loose as to permit one of said members to rock and rotate slightly with relation to the other but being independently capable when said connections are arranged substantially off the vertical of temporarily holding said die cutting member in approximate position on said supporting spindle member prior to and during the assembly of said cage and until the initial screw threaded engagement of said supporting member and cage is accomplished and thereafter to permit accurate axial alignment and locking of said members in abutting contact by said cage, said cage having at one end an internal thread adapted to screw onto the external thread of the supporting member and at the other end an internal conical surface adapted to fit the external tapered surfaces of the prongs, whereby when the cage is screwed down on the supporting member the annular ground ends of that member and of the die cutting members are pressed and the axes of the bores of said members are brought into alignment and all relative rocking and axial misalignment of said members is prevented.

2. The combination in a die cutting device of a supporting spindle member, a die cutting member, and a cage, the supporting spindle member having a flat end surface at right angles to the spindle axis and an external thread, the die cutting member having an axial bore, an annular hub having an end surface ground at right angles to the axis of the bore and separated prongs extending outwardly axially, each prong having thread cutting teeth on its inner surface, and a tapered external surface, loosely-fitting headed connections between the abutting ends of the supporting member and the die cutting member, the parts of which connections are mutually engageable by relative radial movement only, said connections preventing direct axial separation of said members and being so loose as to permit one of said members to rock and rotate slightly with relation to the other, and interengaging means to assist in temporarily holding said die cutting member in approximate position on said supporting spindle member prior to and during the assembly of said cage and until the initial screw threaded engagement of said supporting member and cage is accomplished and thereafter to permit accurate axial alignment and locking of said members in abutting contact by said cage, said cage having at one end an internal thread adapted to screw onto the external thread of the supporting member and at the other end an internal conical surface adapted to fit the external tapered surfaces of the prongs, whereby when the cage is screwed down on the supporting member the flat abutting end of that member and of the die cutting member are pressed together and the axes of the bores of said members are brought into alignment and all relative rocking and axial misalignment of said members is prevented.

3. The combination in a die cutting device of a supporting spindle member, a die cutting member, and a cage, the supporting spindle member having a flat end surface at right angles to the spindle axis and an external thread, the die cutting member having an axial bore, an annular hub having an end surface ground at right angles to the axis of the bore and separated prongs extending outwardly axially, each prong having thread cutting teeth on its inner surface, and a tapered external surface, loosely-fitting headed connections between the abutting ends of the supporting member and the die cutting member, the parts of which connections are mutually engageable by relative radial movement only, said connections preventing direct axial separation of said members and being so loose as to permit one of said members to rock and rotate slightly with relation to the other, and frictional means to assist in temporarily holding said die cutting member in approximate position on said supporting spindle member prior to and during the assembly of said cage and until the initial screw threaded engagement of said supporting member and cage is accomplished and thereafter to permit accurate axial alignment and locking of said members in abutting contact by said cage, said cage having at one end an internal thread adapted to screw onto the external thread of the supporting member and at the other end an internal conical surface adapted to fit the external tapered surfaces of the prongs, whereby when the cage is screwed down on the supporting member the flat abutting end of that member and of the die cutting member are pressed tightly together and the axes of the bores of said members are brought into alignment and all relative rocking and axial misalignment of said members is prevented.

4. The combination in a die cutting device of a supporting spindle member, a die cutting member, and a cage, the supporting spindle member having a flat end surface at right angles to the spindle axis and an external thread, the die cutting member having an axial bore, an annular hub having an end surface ground at right angles to the axis of the bore and separated prongs extending outwardly axially, each prong having thread cutting teeth on its inner surface, and a tapered external surface, loosely-fitting headed connections between the abutting ends of the supporting member and the die cutting member, the parts of which connections are mutually engageable by relative radial movement only, said connections preventing direct axial separation of said members and being so loose as to permit one of said members to rock and rotate slightly with relation to the other, and spring-pressed means to assist in temporarily holding said die cutting member in approximate position on said supporting spindle member prior to and during the assembly of said cage and until the initial screw threaded engagement of said supporting member and cage is accomplished and thereafter to permit accurate axial alignment of said members in abutting contact by said cage, and the cage having at one end an internal thread adapted to screw onto the external thread of the supporting member and at the other end an internal conical surface adapted to fit the external tapered surfaces of the prongs, whereby when the cage is screwed down on the supporting member the flat abutting end of that member and of the die cutting member are pressed tightly together and the axes of the bores of said members are brought into alignment and all relative rocking and axial misalignment of said members is prevented.

ALFRED J. KIEHNE.